United States Patent [19]

Stedman

[11] Patent Number: 5,308,135

[45] Date of Patent: May 3, 1994

[54] SACRIFICIAL STATIONARY SUPPORT FOR MOUNTING SAFETY GLASS IN AUTOMOTIVE VEHICLES AND WINDOW INSTALLATION METHOD

[75] Inventor: Dennis F. Stedman, Ortonville, Mich.

[73] Assignee: Chrysler Corporation, Highland Park, Mich.

[21] Appl. No.: 60,137

[22] Filed: May 13, 1993

[51] Int. Cl.$^5$ .................................................. B60J 1/00
[52] U.S. Cl. ................................... 296/96.21; 296/201
[58] Field of Search ............................. 296/96.21, 201

[56] References Cited

U.S. PATENT DOCUMENTS

| | | | |
|---|---|---|---|
| 2,503,882 | 4/1950 | Medford | 154/83 |
| 3,608,051 | 9/1971 | Scott | 264/261 |
| 3,907,949 | 9/1975 | Carlson | 264/6 |
| 3,940,301 | 2/1976 | Straw et al. | 156/155 |
| 3,969,452 | 7/1976 | Ciliberti et al. | 264/41 |
| 4,659,138 | 4/1987 | Gösse et al. | 296/96.21 X |
| 4,815,794 | 3/1989 | Becker et al. | 305/60 X |
| 4,912,895 | 4/1990 | Harris, Jr. | 52/208 |
| 4,938,521 | 7/1990 | Kunert | 296/96.21 |
| 5,013,077 | 5/1991 | Stevens | 296/96.21 |
| 5,079,931 | 1/1992 | Lehto et al. | 65/288 |
| 5,152,576 | 10/1992 | Ris | 296/96.21 |

*Primary Examiner*—Joseph D. Pape
*Attorney, Agent, or Firm*—Kenneth H. MacLean

[57] ABSTRACT

A support of a water dissolvable material is provided for the installation of windshields and other stationary safety glass in automotive vehicles. The support guides and mechanically holds the glass in position until adhesive previously applied to the periphery of the glass cures and permanently secures the glass in position in a window opening in the vehicle body. Subsequently, a solvent such as water naturally occurring or intentionally applied to the support causes it to dissolve and disappear so that it does not aid in creating vibration and resultant noise in the stationary glass during vehicle operation.

5 Claims, 1 Drawing Sheet

SACRIFICIAL STATIONARY SUPPORT FOR MOUNTING SAFETY GLASS IN AUTOMOTIVE VEHICLES AND WINDOW INSTALLATION METHOD

FIELD OF THE INVENTION

This invention relates to a sacrificial support and to a method for mounting stationary glass windows in openings therefor in automotive vehicles.

BACKGROUND OF THE INVENTION

Prior to the present invention, adhesives have been employed to permanently secure safety glass in windshield openings and in back and side window openings as provided in the body work in vehicles. In many installations, special permanent glass supports of reinforced nylon or other tough plastics material have been employed as an aid in the initial support in the installation procedures involving stationary glass.

For example in the case of windshield installation, these permanent supports are secured to cowling, or other body components, at points just beneath the windshield opening so that an outwardly extending ledge is provided to contact and support the windshield at spaced locations along the lower peripheral edge thereof. This allows the windshield to be precisely located at a predetermined position so that it can be pressed inwardly to wet out and set the adhesive such as provided by a continuous bead of urethane applied around a previously primed edge of the windshield. Furthermore, the windshield is securely maintained in position by the supports while the adhesive cures and permanently fixes the windshield in a predetermined position. Thus, the adhesive generally isolates the window glass from body vibration such as might be generated by vehicle operation over a rough roadway.

The adhesive further provides a seal between the window opening and the windshield that effectively blocks the entry of wind, water and foreign matter into the interior of the vehicle. After the adhesive cures, the support serves no important function but cannot be readily or conveniently removed.

While permanent window glass mounting supports have met with good success as evidenced by wide spread acceptance and use, generation of objectionable vibration and noise are possible in some installations by a direct transfer of vibrations from the body panel to the window glass through the mounting support. Also, objectionable vibration and noise can be generated and transferred to the glass by indirect transfer through dirt or other foreign matter which collects between the lower edge of the windshield and an outwardly extending ledge of the permanent support. Lateral movements between the support's ledge and the edge of the window glass can transfer vibrations and noise, either directly or indirectly through the foreign matter.

SUMMARY OF THE INVENTION

With the above noise problems occurring in a wide range of stationary glass installations and with increased use of stationary glass supports, this invention is drawn to a new and improved method of mounting stationary glass in window openings in vehicle body work and to a new and improved windshield glass support.

More particularly, this invention is drawn to the provision of a water soluble and sacrificial glass support which dissolves after the support accomplishes its main function in the accurate mounting of glass across the opening formed in vehicle body work and maintaining the glass in position until adhesive cures. After dissolution of the glass support by water, the support no longer exists to either contact the edge of the glass or to collect dirt and foreign matter adjacent the edge of the glass. It also follows that the dissolution of the support itself eliminates any direct rubbing between the glass edge and the support and therefore eliminates points where vibration and noise can be generated.

The present invention is also drawn to a new and improved stationary glass support for locating and holding such glass in place while the glass is being installed and while adhesive used to permanently fix the glass in its opening cures to a point at which the support is no longer needed.

This invention is further drawn to a new and improved method of installing fixed window glass in the body work of a vehicle, which includes the use of a window support of a material that dissolves so that there can be no noise generated by friction occurring on relative movement between the support and the window glass.

These and other features, objects and advantages will become more apparent from the drawing which is illustrative of the invention and the brief description thereof, the detailed description of the preferred embodiments, and the method or glass installation and the claims.

DETAILED DESCRIPTION OF THE PREFERRED EMBODIMENTS AND METHODS

Figure 1:
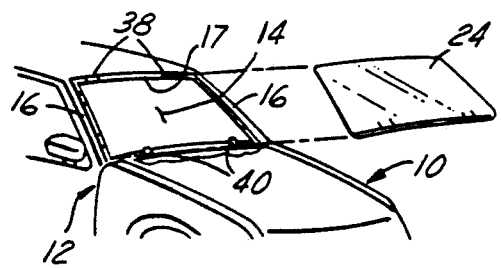
FIG. 1 is a pictorial view of a forward portion of an automotive vehicle and windshield therefor prior its installation into an opening in the vehicle body.
Figure 2:
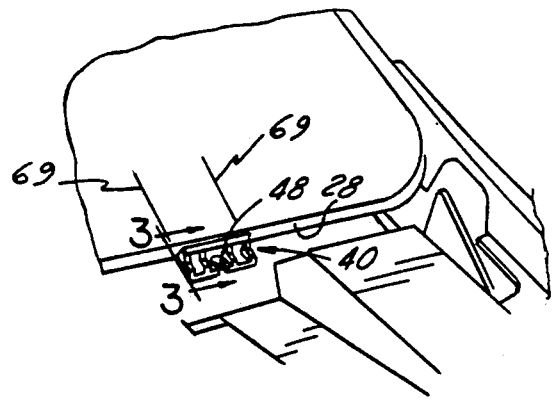
FIG. 2 is an enlarged view of a portion of FIG. 1 but with the windshield shown in an installed position utilizing the supports of this invention.

Turning now in greater detail to the drawings, there is shown a forward portion 10 of an automotive vehicle having a body 12 with a generally rectilinear windshield glass opening 14 therein bounded (1) on either side by "A" pillars 16 of the body, and (2) along its upper extent by the forward edge portion 17 of the roof panel, and (3) along its lower edge by the upper end 18 of cowling 20 or other body structure. Portions of these body components are inwardly offset to provide a fence for the windshield.

The fence accommodates a horizontally and vertically curved laminated safety glass windshield 24, which is to be mounted as stationary glass in peripheral support edges as provided by the fence and by cowling 20 defining the opening 14. Prior to installation of the glass windshield in the opening, edge portions of the inner surface of the windshield adjacent to the peripheral edge 28 thereof are primed with a black out primer 30. Subsequently, an endless bead, about 10 mm width, of urethane 32 or other suitable adhesive and fluid sealant is applied on the blackout primer 30 so that the windshield is fully prepped for installation.

The fence defining the upper and side edges of the opening 14 may have resilient compression spacers 38 made of urethane or other suitable material at spaced positions from each other to cushion the windshield installation as is well known in this art.

To ensure that the windshield 24 is accurately and securely installed with trouble free performance, the present invention provides new and improved windshield supports 40 which are molded or otherwise formed from a polyvinyl alcohol (PVOH) resin such as Vinex TM 2019 (a registered Trademark of Air Products and Chemicals, Inc.) which on exposure to sufficient amounts of water harmlessly breaks down into $CO_2$ and $H_2O$. Other suitable innocuous material, soluble in water or possibly in other dissolvents, may be employed so that they will disintegrate and disappear after they have served their purpose for initial glass installation and retention. After dissolving, the supports cannot contribute to objectionable noise previously experienced with some glass installations using permanent window supports.

The support 40 in its preferred form is shown in FIGS. 2 through 8 and comprises an integral bracket-like structure having a flattened back plate 42 with an inverted U-shaped slot 44 therein which is adapted to fit on the shank 46 of a headed stud 48 that is secured to and projects from the wall 50 of the cowling. The cylindrical head 52 of the stud being of greater diameter than the width of the slot and closely fitting to the interior surface of the back plate 42 adjacent to the edges defining slot 44, provides tight securement of the support to the cowling. Extending at right angles from the upper end of the back plate of the support is an upper or top plate 54, which forms a ledge to support the windshield by direct engagement with the inner edge 28.

Figure 3:
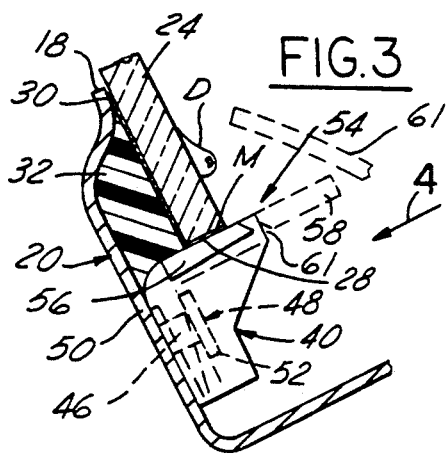
FIG. 3 is a side view partly in section taken generally along sight lines 3—3 of FIG. 2.
Figure 4:
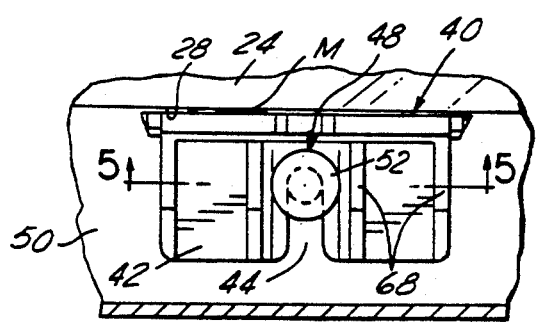
FIG. 4 is a front elevational view of the windshield support as viewed from sight line 4 of FIG. 3.
Figure 5:
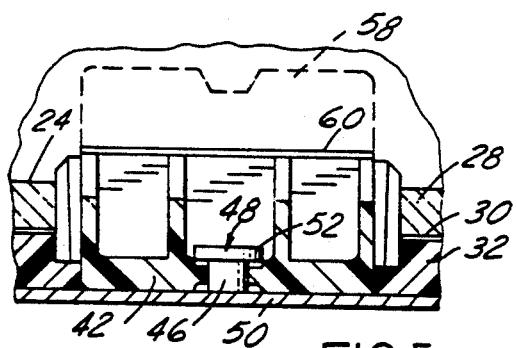
FIG. 5 is a sectional view taken along sight lines 5—5 of FIG. 4.
Figure 8:
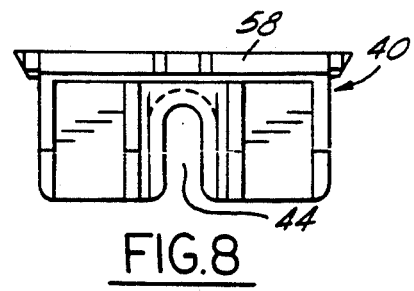
FIG. 8 is front view taken along sight lines 8—8 of FIG. 7.
Figure 7:
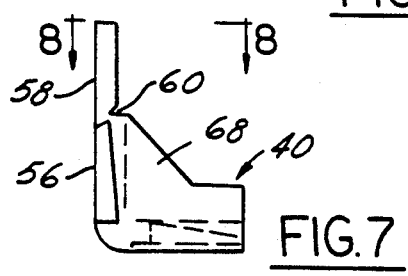
FIG. 7 is a side elevational view of the windshield support of FIG. 6 taken generally along sight lines 7—7 of FIG. 6.
Figure 6:
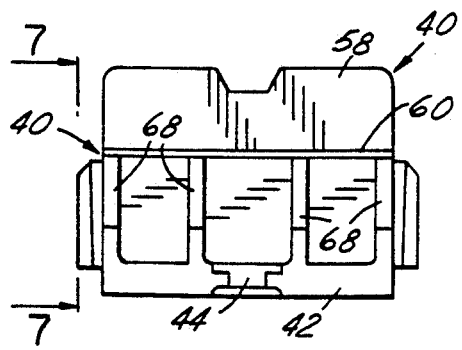
FIG. 6 is a bottom view of a windshield support according to this invention.

As shown best in FIG. 3, the top plate 54 has an inboard glass support section 56 and break-away outboard glass receiving and guide section 58. The support 40 as initially molded is somewhat brittle so that after glass installation the glass receiving and guide section can be broken away and discarded. An elongated V-groove 60 is formed along the underside of top plate 54 to allow ready separation of the two sections from one another. This groove importantly provides a break-off line which allows the installer to easily snap off the glass receiving and guide section 58 from the support section 56 after the windshield has been installed. A panel 61 is a portion of vehicle body work which conceals the lower edge of the windshield and provides a finely finished appearance.

Angular webs 68 which extend between the back plates and the support portion of the top plate, as shown in the Figures, are provided so that the top plate can easily bare the loads of the glass windshield when the windshield is initially installed.

As shown in FIG. 1, two of the supports 40 are installed on studs at spaced positions. After this installation and after the urethane adhesive has been applied to the blackout primer 30, the installer with the aid of an assistant positions the windshield with its lower edge on the glass receiving guide of the support 40. Using the lines 69 removably marked on the windshield and the outboard edges of the support as guide lines, the windshield can then easily be moved by the installers into an installed position. In the installed position, the urethane is in the position shown in FIG. 3. After glass installation, the receiving guide section 58 is snapped off. The windshield is then compressively loaded and held in a loaded position, such as by an adhesive tape, and the urethane is allowed to cure. After curing, suitable reveal or other moldings can be applied to the edges of the windshield to provide a finely finished appearance.

Prior to the present invention, dirt such as sand or gritty materials M, or other foreign matter, could work their way and lodge at the interface between the lower edge of the windshield and the top surface of the support section 56. When this occurred, vibratory motion of the vehicle body and the support 40 secured thereto would effect relative motion between the body and the windshield. The foreign matter, or in some case the support itself, can cause a vibration of the windshield, and resultantly, the emission of undesirable noises therefrom.

To eliminate the point of transfer of this vibration and noise, the sacrificial support 40 softens and dissolves in water. This may occur quickly by flushing the support areas with water. Alternatively, after the vehicle has been used over a relatively short period of time, the support will gradually be dissolved by water, as diagrammatically illustrated by rain water drop D. Accordingly, after the support is dissolved and removed from the area beneath the windshield, the possibility of vibration and noise generation and transmittal is eliminated. Since the support is removed from its prior position after it is no longer needed, the invention provides improvements for support for glass installation and in a method of glass installation.

While a preferred embodiment of the invention has been shown and described, other embodiments will now become apparent to those skilled in the art. Accordingly, this invention is not to be limited to that which is shown and described but by the following claims.

What is claimed is:

1. A method of securing glass windows into window openings provided in the body work of a vehicle and defined by peripheral portions of said body work comprising the steps of:

a. securing a support spacer of water soluble material to the body work of the vehicle in a position on the body work adjacent to a window opening so that it can support a glass window thereon, b. providing an adhesive between the peripheral edge portions of said glass window and the peripheral portions of said body work which defines said window opening, c. installing said glass window onto said body work so that at least one edge thereof is supported on said support spacer and said glass window fits onto said peripheral portions of said body work defining said opening, e. curing said adhesive to form a bond between said peripheral portion of said glass window and the peripheral portion of said body work defining said opening to secure said glass window therein, f. dissolving said support spacer with moisture at least to a point where there is substantially no contact between said glass window and said support surface and to thereby substantially eliminate the potential for noise otherwise generated by contact between said glass and said support spacer and including any frictional rubbing of said glass and foreign matter located between said glass and said support spacer.

2. A method of securing glass windows into window openings provided in the body work of a vehicle comprising the steps of:
   a. securing a support spacer of water soluble material to the body work of the vehicle in a position so that it can support a glass window thereon,
   b. applying a bead of adhesive to the peripheral edge portions of said glass window,
   c. installing said glass window onto said body work so that at least one edge thereof is supported on said support spacer and said window fits onto said peripheral portions of said body work defining said opening and said adhesive bonds to the portions of said body work defining said opening,
   e. curing said adhesive to form a bond between said peripheral portion of said window and the peripheral portion of said body work defining said opening to secure said glass window therein,
   f. dissolving said support spacer with moisture at least to a point where there is substantially no contact between said glass and said support surface and to thereby substantially eliminate the potential for noise otherwise generated by the contact between said glass window and said support spacer and including any frictional rubbing of said glass and foreign matter located between said glass and said spacer.

3. A sacrificial support spacer for initially supporting a motor vehicle glass window unit in a opening provided in the body of an automotive vehicle so that it can be subsequently permanently affixed to the body for closing said opening comprising:
   an attachment portion adapted to be secured to the vehicle,
   a glass support portion associated with said attachment for supporting the window glass in a position in which said glass can be secured to a portion of said body defining said opening,
   at least one of said portions being made from a material that dissolves in water so that said portion will substantially dissolve to thereby substantially eliminate any noise generated by contact between the glass and the support or by friction of the glass generally resulting from collection of foreign material between said glass and any remaining portion of the support.

4. A sacrificial support spacer for supporting a motor vehicle glass window unit in a opening provided in the body of an automotive vehicle so that it can be subsequently permanently affixed by adhesive to the body for closing said opening comprising:
   an attachment portion adapted to be secured to the vehicle,
   a glass support portion associated with said attachment portion for supporting the window glass in a position in which said glass can be secured to a portion of said body defining said opening,
   said support portion being a one piece unit made from a material that dissolves in water so that said portion will substantially dissolve to thereby substantially eliminate any noise generated by contact with the glass and friction of the glass generally resulting from collection of foreign material between said glass and any remaining portion of the support.

5. The support spacer of claim 4, wherein said spacer is made from polyvinyl alcohol.

* * * * *